United States Patent
De Foras

(10) Patent No.: US 11,216,641 B2
(45) Date of Patent: Jan. 4, 2022

(54) LATENT FINGERPRINT DETECTION

(71) Applicant: InvenSense, Inc., San Jose, CA (US)

(72) Inventor: Etienne De Foras, Saint Nazaire les Eymes (FR)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/748,578

(22) Filed: Jan. 21, 2020

(65) Prior Publication Data

US 2020/0234031 A1    Jul. 23, 2020

Related U.S. Application Data

(60) Provisional application No. 62/795,471, filed on Jan. 22, 2019.

(51) Int. Cl.
*G06K 9/00* (2006.01)
*G06F 3/16* (2006.01)

(52) U.S. Cl.
CPC ...... *G06K 9/00114* (2013.01); *G06K 9/00013* (2013.01); *G06K 9/00067* (2013.01); *G06F 3/16* (2013.01)

(58) Field of Classification Search
CPC ...... G06K 9/00013; G06K 9/00; G06K 9/001; G06K 9/00114; G06K 9/00067; B60R 25/52; G06F 3/16
USPC .............................. 340/5.52, 5.83; 382/113
See application file for complete search history.

(56) References Cited

U.S. PATENT DOCUMENTS

| | | | |
|---|---|---|---|
| 6,535,622 B1 * | 3/2003 | Russo | G06K 9/00013 340/5.83 |
| 6,710,700 B1 * | 3/2004 | Tatsukawa | B60R 25/04 340/5.52 |
| 2013/0216106 A1 * | 8/2013 | Hara | G06K 9/001 382/115 |
| 2018/0173924 A1 * | 6/2018 | Zhang | G06K 9/00 |

* cited by examiner

*Primary Examiner* — Abdul-Samad A Adediran

(57) ABSTRACT

In a method for operating a fingerprint sensor, a fingerprint capture operation is performed on a fingerprint of a finger contacting the fingerprint sensor. A finger lift action is detected. It is determined whether a latent fingerprint remains on a contact surface of the fingerprint sensor subsequent the finger lift action. If it is determined that a latent fingerprint remains on the contact surface of the fingerprint sensor subsequent the finger lift action, instruction on addressing the latent fingerprint is provided.

21 Claims, 9 Drawing Sheets

LATENT FINGERPRINT DETECTION

RELATED APPLICATION

This application claims priority to and the benefit of U.S. Provisional Patent Application 62/795,471, filed on Jan. 22, 2019, entitled "LATENT FINGERPRINT DETECTION AND REMOVAL ON A FINGERPRINT SYSTEM," by Etienne De Foras, and assigned to the assignee of the present application, which is incorporated herein by reference in its entirety.

TECHNICAL FIELD

The present disclosure relates to a fingerprint reader system. In particular, methods for reducing issues associated with latent fingerprints are described.

BACKGROUND

Security and authorization systems that rely on fingerprint identification are widely used. Fingerprints can be identified using optical, multispectral, capacitive, or ultrasound sensors that determine a unique pattern of finger ridges and valleys. Such fingerprint readers can be a part of electronic or physical lock systems that prevent unauthorized opening or usage of electronic devices, buildings, or vehicles.

One problem with fingerprint readers that require finger contact with a surface or platen is associated with latent fingerprints. Dirt, grease, or natural body oils on a finger can remain on a reading surface, interfering with subsequent fingerprint reads or allowing for unauthorized capture of the fingerprint. This is a particular problem for publicly accessible fingerprint readers, for example, for vehicles or fingerprint readers for building access.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

Figure 1:
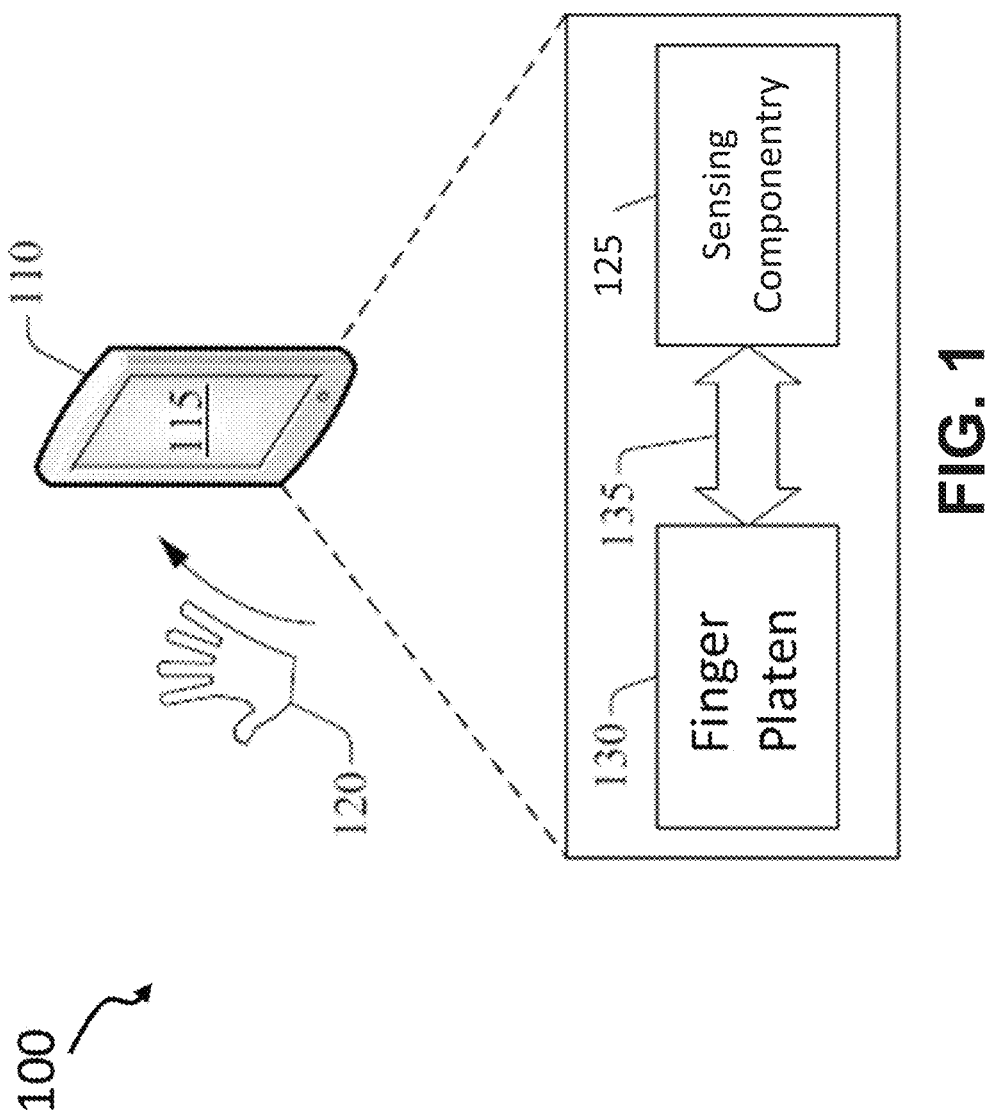
FIG. 1 illustrates an example of an operational environment for sensing of human touch, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "performing," "detecting," "determining," "providing," "receiving," "analyzing," "confirming," "displaying," "presenting," "using," "completing," "instructing," "comparing," "executing," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of a device including a fingerprint sensor, upon which described embodiments can be implemented. An example fingerprint sensing system for detecting and addressing latent fingerprints is then described, in accordance with various embodiments. Example operations of a fingerprint sensor for detecting and addressing latent fingerprint are then described.

Fingerprint sensors are used in electronic devices for user authentication, such as mobile electronic devices, building locks, automobile locks, etc. In many situations, fingerprints sensors are comprised within or utilized with electronic devices that are or may become publicly accessible. For example, fingerprint sensors may be utilized as access controls for external access to a building (e.g., a lock), for an automated teller machine (ATM), automobile, etc. Moreover, mobile electronic devices, such as smart phones, may become publicly accessible due to their transportability. For example, a person can leave their mobile electronic device unattended, or it may be lost/stolen.

Embodiments described herein provide systems and methods for operating a device including a fingerprint sensor. As utilized herein, a fingerprint sensor refers to an electronic device for capturing an image of a fingerprint of a finger contacting a contact surface (e.g., a platen) overlying the fingerprint sensor. It should be appreciated that the contact surface can be integrated with the fingerprint sensor, or can be a separate physical component overlying the fingerprint sensor. In some embodiments, the fingerprint sensor can be operated within a touch-screen display device, wherein the fingerprint sensor underlies the touch-screen display device, and the contact surface of the touch-screen display device is the contact surface upon which a finger is placed to utilize the fingerprint sensor. It should be appreciated that the fingerprint sensor can include an optical sensor, multispectral sensor, capacitive sensor, ultrasound sensor, or any other type of sensor capable of capturing and determining a pattern of finger ridges and grooves on a finger.

Embodiments described herein provide methods and systems for operating a fingerprint sensor. A fingerprint capture operation is performed on a fingerprint of a finger contacting the fingerprint sensor. A finger lift action is detected. It is determined whether a latent fingerprint remains on a contact surface of the fingerprint sensor subsequent the finger lift action. If it is determined that a latent fingerprint remains on the contact surface of the fingerprint sensor subsequent the finger lift action, instruction on addressing the latent fingerprint is provided. In some embodiments, the instruction is provided to a user (e.g., visually and/or audibly) on how to clear the latent fingerprint from the contact surface. In other embodiments, the instruction is provided to a device (e.g., an external device or the fingerprint sensor device) for automatic clearing of the latent fingerprint. For example, instructions can include advising a user to wipe a finger on the finger platen after a fingerprint capture.

In some embodiments, determining whether a latent fingerprint remains on a contact surface of the fingerprint sensor subsequent the finger lift action includes determining how the finger was removed from the contact surface of the fingerprint sensor during the finger lift action. For example, if it is determined that the finger was removed from the contact surface of the fingerprint sensor in a substantially vertical direction, it can be determined that a latent fingerprint remains on the contact surface of the fingerprint sensor, as there is a small likelihood that the latent fingerprint would be smeared or smudged by the user during the finger lift action. In contrast, if it is determined that the finger was removed from the contact surface of the fingerprint sensor in a non-vertical direction, it can be determined that a latent fingerprint does not remain on the contact surface of the fingerprint sensor, as there is an increased likelihood that the latent fingerprint would be smeared or smudged by the user during the finger lift action.

In other embodiments, determining whether a latent fingerprint remains on a contact surface of the fingerprint sensor subsequent the finger lift action includes performing a latent fingerprint capture operation subsequent removal of the finger from a contact surface of the fingerprint sensor. If the latent fingerprint capture operation detects a latent fingerprint, it is determined that a latent fingerprint remains on a contact surface of the fingerprint sensor.

Example Fingerprint Sensor and System for Detecting and Addressing Latent Fingerprints Fingerprint sensors are used in electronic devices for user authentication, such as electronic devices (e.g., mobile or portable electronic devices), building locks, automobile locks, etc. In many situations, fingerprints sensors are comprised within or utilized with electronic devices that are or may become publicly accessible. For example, fingerprint sensors may be utilized as access controls for external access to a building (e.g., a lock), for an automated teller machine (ATM), etc. Moreover, mobile electronic devices, such as smart phones, may become publicly accessible due to their transportability. For example, a person can leave their mobile electronic device unattended, or it may be lost/stolen.

With reference to the drawings, FIG. 1 illustrates an example of an operational environment 100 for sensing of human touch and providing an accurate fingerprint read in accordance with one or more embodiments of the disclosure. As illustrated, environment 100 includes a device 110 including a fingerprint sensor 115 for performing fingerprint capture and authentication. In one embodiment, fingerprint sensor 115 is disposed beneath a touch-screen display device of device 110. In another embodiment, fingerprint sensor 115 is disposed adjacent or close to a touch-screen display device of device 110. In another embodiment, fingerprint sensor 115 is comprised within a touch-screen display device of device 110. In another embodiment, fingerprint sensor 115 is disposed on the side or back of the device. It should be appreciated that device 110 includes a fingerprint sensor 115 for sensing a fingerprint of a finger interacting with device 110. It should also be appreciated that device 110 may be a mobile electronic device, or may be a device with a fixed location (e.g., affixed to a wall, integrated within a car handle, etc.)

In one embodiment, a human finger (represented by a hand 120), can touch or interact with a specific area of device 110 proximate fingerprint sensor 115 (e.g., finger platen 130). In various embodiments, fingerprint sensor 115 can be hard and need not include movable parts, such as a sensor button configured to detect human touch or otherwise cause the device 110 to respond to human touch. The device 110 can include circuitry that can operate in response to touch (human or otherwise) of the touch-screen display device and/or fingerprint sensor 115 (or, in some embodiments, the other type of touch sensitive surface).

In accordance with various embodiments, sensing componentry 125 can be operatively coupled (e.g., electrically coupled, communicatively coupled, etc.) to finger platen 130 via a transmission medium or conductive conduits configured to permit the exchange of signals between the finger platen 130 and the sensing componentry 125. In some embodiments, a CMOS die and printed circuit board (PCB) placed within and/or behind the touch-screen display device of device 110 can include the finger platen 130, the sensing componentry 125, and the transmission medium 135 of fingerprint sensor 115. In one embodiment, the finger platen 130 and the sensing componentry 125 can be configured or otherwise arranged in a single semiconductor die. In another embodiment, the finger platen 130 can be configured or otherwise arranged in a first semiconductor die and the sensing componentry 125 can be configured or otherwise arranged in a second semiconductor die. In addition, in some embodiments, the transmission medium 135 can be embodied in or can include a dedicated conductive or transmissive contact layer that allows the propagation of electrical, optical, ultrasonic, or other signals between the finger platen 130 and the sensing componentry 125.

As described herein, in some embodiments, the finger platen 130 and the sensing componentry 125 can be configured in a dedicated fingerprint sensor 115 that controls access to buildings or vehicles. In other embodiments, the finger platen 130 and the sensing componentry 125 can be built into a mobile device such as a smartphone, a tablet computer, a laptop computer. In other embodiments, the finger platen 130 and the sensing componentry 125 can be configured within a wearable device (e.g., a heart rate monitor, an insulin pump, or the like). It is noted that, in some scenarios, wearable devices may rely on or otherwise communicate with a mobile device (e.g., a smartphone, a tablet computer). Accordingly, in one of such scenarios, the finger platen 130 and portions of the sensing componentry 125 can be distributed between a wearable device and the mobile device.

In some embodiments, in response to the detecting a finger touch, system operations can include predicting that the touch is associated with a human body part (such as a finger) based on a touch criterion. For example, dedicated circuitry can be configured to determine, within a specific accuracy, that the touch is associated with a human touch. The specific accuracy can be associated with a technique relied upon to predict that the detected touch is associated with a human touch. In some implementations, predicting that the touch can be associated with a human touch can include one or more of: (i) determining that a force greater than a first predetermined threshold (e.g., about 0.005 N, about 0.05 N, or about 0.5 N) was exerted on a surface of the touch-screen display device; (ii) determining that a pressure greater than a second predetermined threshold (e.g., about 50 Pa, about 500 Pa, or about 5000 Pa) was exerted on the surface of the touch-screen display device; (iii) determining that the specific area overlaps with a predetermined number of pixels; or (iv) determining that the touch caused a defined frequency response. In addition, or in other implementations, predicting that the touch can be associated with a human touch (via a finger or other body part, for example) can include determining that a first frequency response of a mass that causes the touch to acoustic sound corresponds to a second frequency response of the human finger to the acoustic sound.

In one embodiment, an ultrasonic fingerprint sensing system can be used. The sensing componentry 125 can determine, based on a difference in interference of the acoustic signal with valleys and/or ridges of the skin on the finger, an image depicting epi-dermis and/or dermis layers of the finger. In some embodiments the system circuitry can identify latent fingerprints and initiate various actions (to be discussed in the following) to minimize associated risks. Further, the sensing componentry 125 can compare the image with a set of known fingerprint sensor images to facilitate identification and/or authentication. Moreover, in one example, if a match (or substantial match) is found, the identity of user can be verified. In another example, if a match (or substantial match) is found, a command/operation can be performed based on an authorization rights assigned to the identified user. In yet another example, the identified user can be granted access to a physical location and/or network/computer resources (e.g., documents, files, applications, etc.).

Figure 2:
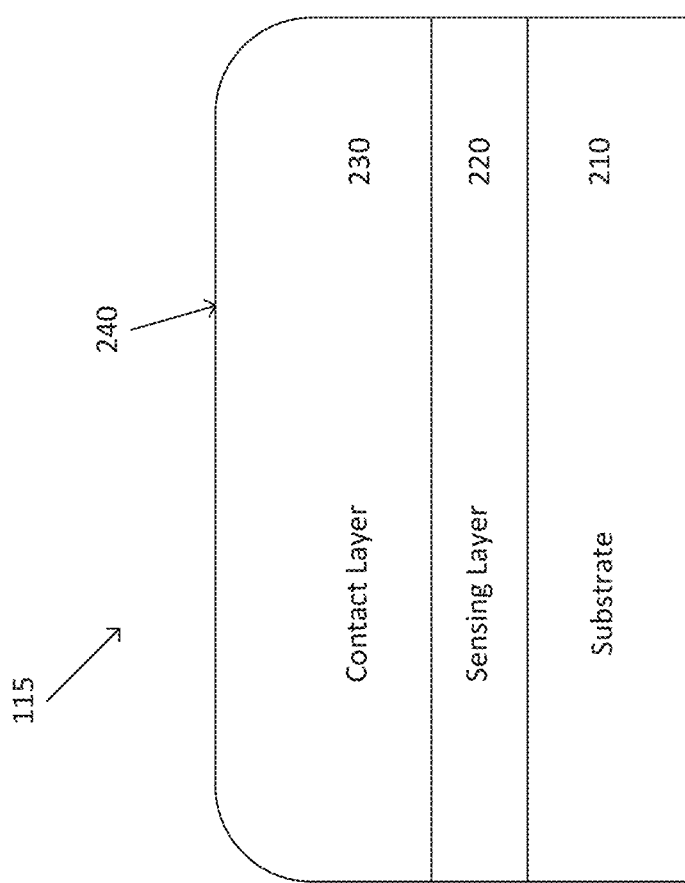
FIG. 2 illustrates a cross section view of a fingerprint sensors, according to an embodiment.

FIG. 2 illustrates a cross section view of fingerprint sensor 115, according to an embodiment. As illustrated, fingerprint sensor 115 includes several different layers. Fingerprint sensor 115 includes an active sensing layer 220 (e.g., sensing componentry 125) on top of a substrate 210. The active sensing layer 220 may use various techniques to sense or detect the fingerprint, e.g., optical, acoustic or ultrasonic techniques. It should be appreciated that active sensing layer 220 may not extend to the edges of contact layer 230. For an ultrasonic fingerprint sensor, the sensing layer may comprise an array of ultrasonic transducers that may be used emit and detect ultrasonic waves. Contact layer 230 (e.g., finger platen 130) overlays sensing layer 220, where the outer surface of contact layer 230 is contact surface 240. For example, a user using fingerprint sensor 115 places his or her finger in contact with contact surface 240.

In some embodiments, contact layer 230 includes a display device (e.g., a touch-screen display device). In some embodiments, an acoustic coupling layer, and/or other layers such as display devices, may be used between sensing layer 220 and contact layer 230 onto which the user puts his or her finger. It should be appreciated that in some embodiments, contact layer 230 and the acoustic coupling layer are a single layer. It should be further appreciated that fingerprint sensor 115 may include other layers, such as bonding layers and laminate layers, and is not intended to be limited to the specific layers shown. In other embodiments, sensing layer 220 of fingerprint sensor 115 may include separate signal transmission and signal detection layers.

Various techniques can be used to reduce hazards associated with persistence of latent fingerprints. For example, the touch-screen display device can be used to display warnings or instructions indicating a likelihood of leaving a latent fingerprint and/or for cleaning or otherwise removing a recognizable latent print by rotating or wiping the finger on the finger platen after a successful fingerprint read. Other systems and methods can include a latent print detector to provide a visual, audible, or vibratory warning if a latent print is detected. Other embodiments can, alone or in addition, support mechanical, thermal, or vibratory systems that automatically remove latent prints. In some embodiments, manually operated sweeps, wipes, or covers can be used to remove a latent print. In still other embodiments, cleaning fluids can be automatically released, sprayed or applied to assist in removal of latent prints. In still other embodiments, hydrophobic or oil resistant coatings can be used to decrease likelihood of latent prints.

Figure 3:
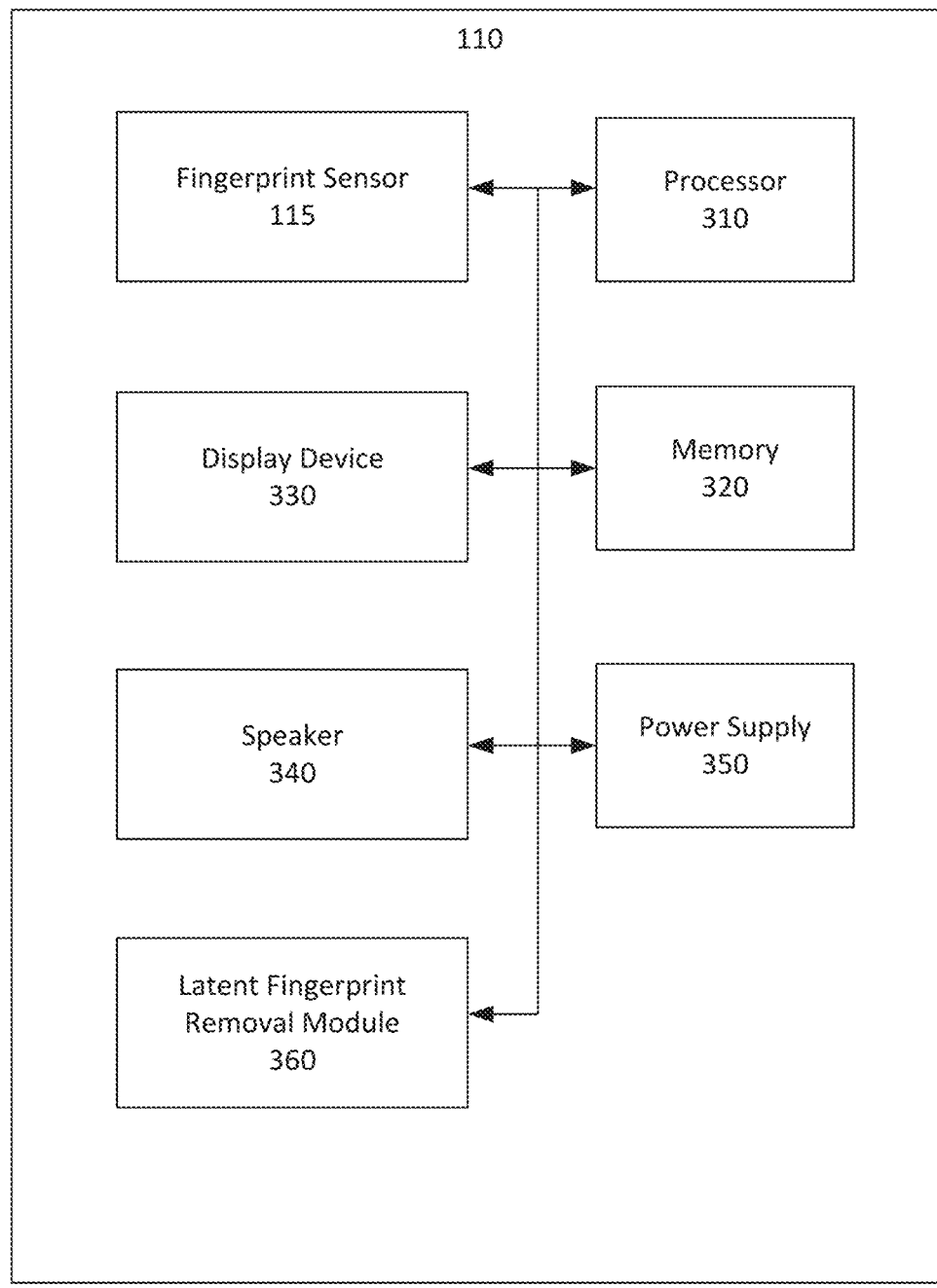
FIG. 3 illustrates an example device including a fingerprint sensor, in accordance with various embodiments.

FIG. 3 illustrates an example device 110, in accordance with various embodiments. In one embodiment, device 110 includes a fingerprint sensor 115, a processor 310, and a memory 320. In various embodiments, processor 310 performs certain operations in accordance with instructions stored within memory 320. In some embodiments, processor 310 and memory 320 are configured to control and operate fingerprint sensor 115. In other embodiments, fingerprint sensor 115 may be comprised within a sensor processing unit (SPU) including a dedicated processor and memory. In some embodiments, device 110 includes a display device 330 (e.g., a touch-screen display device) for presenting visual information. In some embodiments, device 110 includes a speaker 340 for presenting audible information. In some embodiments, device 110 includes a power supply 350. In some embodiments, device 110 includes a latent fingerprint removal module 360 (e.g., a mechanical sweep) for cleaning or clearing a contact surface of fingerprint sensor 115. It should be appreciated that components of device 110 are examples, and that certain components may not be located within electronic device 110. For example, display device 330 and speaker 340 may be external to device 110.

While the embodiment of FIG. 3 includes processor 310 and memory 320, as described above, it should be appreciated that various functions of processor 310 and memory 320 may reside in other components of device 110 (e.g., within fingerprint sensor 115). Moreover, it should be appreciated that processor 310 may be any type of processor for performing any portion of the described functionality (e.g., custom digital logic).

The componentry of device 110 can include numerous functional elements (e.g., components, platforms, I/O interfaces, connector, adapters, or the like) that individually or in combination can provide specific functionality to the device 110. For instance, if the device 110 embodies a smartphone, the componentry can further include a radio unit (not shown) which can include antenna(s) and processing circuitry that can permit or otherwise facilitate wireless communication between the device 110 and other devices (e.g., a base station or a wireless computing device). For the sake of clarity, at least some of such functional elements are not shown.

In various embodiments, power supply 350 can energize at least some of the components of the device 110. For example, electronic device 110 can include a power controller that can receive trigger signaling (e.g., a control instruction) and, in response, can energize processor 310 from a power-save state to a full-power state. Processor 310 that transitions from the power-save state to the full power state can execute one or more analyses in order to analyze features (e.g., fingerprints) of an image of a fingerprint from the fingerprint sensor 115 that triggered the trigger signaling. In various embodiments, the analysis of the image of a fingerprint can include computer-accessible instruction (e.g., computer-readable instructions and/or computer-executable instructions) that in response to execution by a processor can permit or otherwise facilitate the device 110 to implement a defined algorithm (or process) for fingerprint identification or analysis. In response to execution, in certain implementations, such instructions also can permit or otherwise facilitate the device 110 to perform other types of analysis related to a health condition of a human associated with a detected human touch. The memory 320 also can include memory elements including data and/or instructions for analysis of human touch (e.g., fingerprint recognition, voice identification, or the like).

In various embodiments, fingerprint sensor 115 can include ultrasonic transducers (e.g., PMUTs) or capacitive micromachined ultrasonic transducers (CMUTs) able to generate and detect acoustic/pressure waves. In embodiments, device 110 includes fingerprint sensor 115 comprised of an array of ultrasonic transducers that can facilitate ultrasonic signal generation and sensing. For example, fingerprint sensor 115 can include a silicon wafer having a two-dimensional (or one-dimensional) array of ultrasonic transducers.

Figure 4:
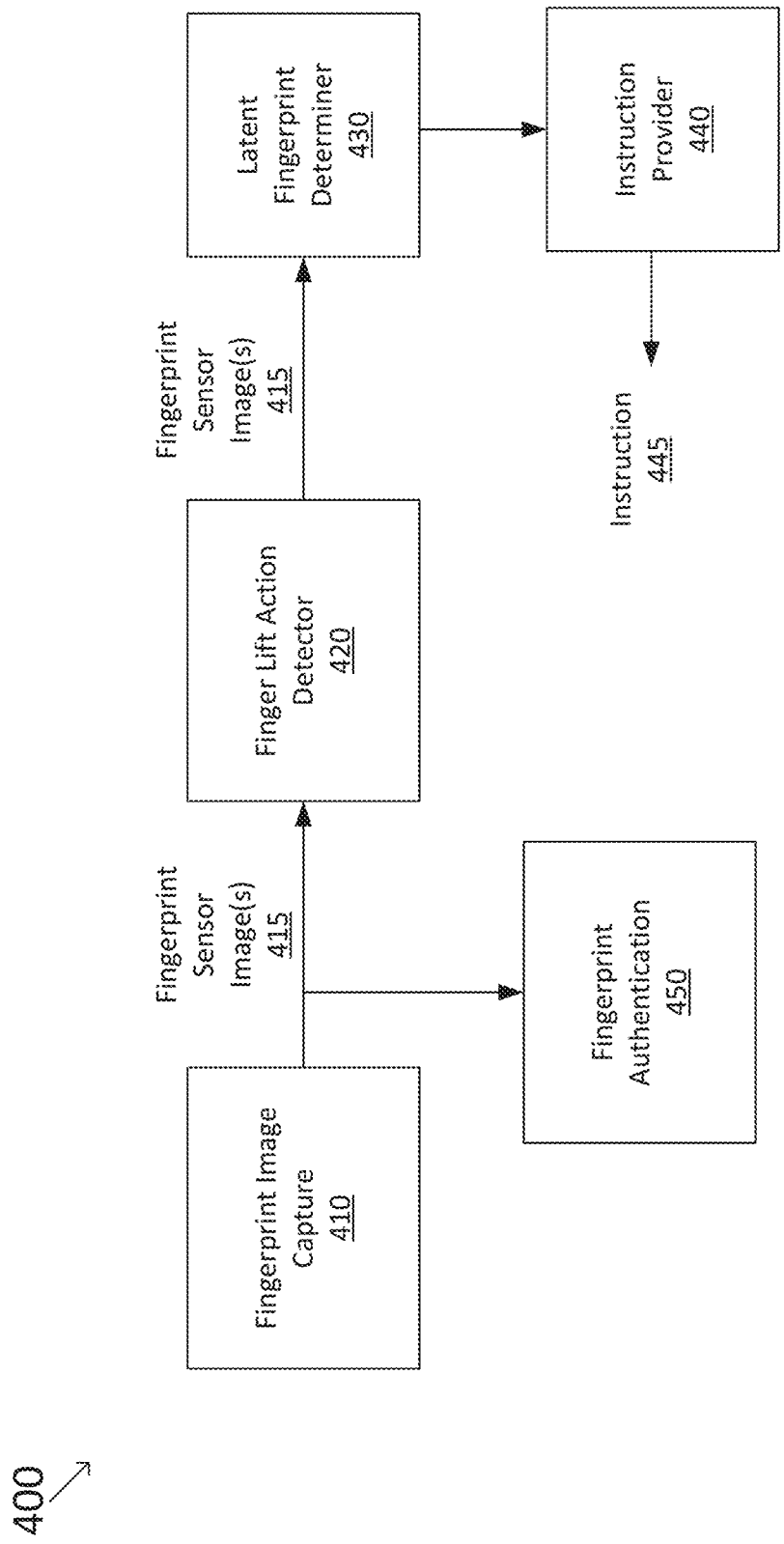
FIG. 4 illustrates a block diagram of an example fingerprint sensing system for determining whether a latent fingerprint remains on a contact surface of the fingerprint sensing system, according to some embodiments.

FIG. 4 illustrates a block diagram of an example fingerprint sensing system 400 for determining whether a latent fingerprint remains on a contact surface of the fingerprint sensor subsequent the finger lift action, according to some embodiments. Responsive to determining that a latent fingerprint remains on the contact surface, fingerprint sensing system 400 is configured to provide instruction on addressing the latent fingerprint. It should be appreciated that fingerprint sensing system 400 can be implemented as hardware, software, or any combination thereof. It should be appreciated that fingerprint image capture 410, fingerprint lift action detector 420, latent fingerprint determiner 430, and instruction provider 440 may be comprised within a single component, separate components, or combined in various combinations, in accordance with some embodiments.

Fingerprint sensing system 400 is configured to perform a fingerprint capture operation on a finger contacting a fingerprint sensor (e.g., at finger platen 130) at fingerprint image capture 410. It should be appreciated that fingerprint image capture 410 can be any type of image capture device, including without limitation, an ultrasonic sensor, an optical sensor, a camera, etc. Fingerprint image capture 410 is configured to capture one or more fingerprint sensor images 415.

In some embodiments, the fingerprint sensor may be used in a wiping mode, even if the fingerprint sensor is an area sensor that could read that fingerprint when the user just puts the finger on the sensor. In the wiping mode, the area sensor is operated similar to a line-type sensor, where one or more lines of the sensors are read while the user moves his or her finger. The fingerprint is then constructed based on the sequential reading of the one or more lines of the sensor. As such, an area sensor may be operated in an area mode and a line/wiping mode depending on the requirements. For example, when no latent fingerprint should be left, the line mode may be preferred over the area mode Fingerprint sensor image(s) 415 is received at finger lift action detector 420, where it is determined whether the finger is in contact with the contact surface of the fingerprint sensor. It should be appreciated that finger lift action detector 420 can receive one or more fingerprint sensor images 415, and that a plurality of fingerprint sensor images 415 may include a sequence or series of fingerprint sensor images 415. In one embodiment, finger lift action detector 420 detects that a finger lift action has occurred by analyzing fingerprint sensor image 415. In one embodiment, finger lift action detector 420 can analyze a fingerprint sensor image 415 to determine whether fingerprint sensor image 415 includes characteristics of a fingerprint (e.g., ridges and valleys). If fingerprint sensor image 415 does not include characteristics of a fingerprint, it can be determined that a finger lift action has occurred. In another embodiments, finger lift action detector 420 can analyze a series of fingerprint sensor images 415 and detect a finger lift action in response to determining that the series of fingerprint sensor images 415 has changed such that at least one later image does not include characteristics of a fingerprint. In other embodiments, finger lift action detector may be an external presence sensor (e.g., a capacitive presence detector) capable of detecting whether a finger is in contact with the fingerprint sensor. It should be appreciated that in accordance with some embodiments, finger lift action detector 420 is optional.

Latent fingerprint determiner 430 is configured to determine whether a latent fingerprint remains (or is likely to remain) on a contact surface of the fingerprint sensor. In one embodiment, latent fingerprint determiner 430 is configured to determine whether a latent fingerprint remains on a contact surface of the fingerprint sensor subsequent the finger lift action. In some embodiments, latent fingerprint determiner 430 receives fingerprint sensor images 415 from fingerprint image capture 410 and/or finger lift action detector for determining whether a latent fingerprint remains on a contact surface of the fingerprint sensor.

In one embodiment, where fingerprint sensing system 400 is disposed within a mobile electronic device, provided there is a likelihood of public access to the mobile electronic device, latent fingerprint determiner 430 determines whether a latent fingerprint remains on the contact surface of the fingerprint sensor subsequent the finger lift action. For example, if it is determined that the mobile electronic device is not within a registered private location (e.g., the user's home), latent fingerprint determiner 430 may be executed. Whether or not latent fingerprint determiner 430 is activated may be based on the location, context, environmental conditions, etc. These conditions may be determined using other sensor incorporated in the device.

In some embodiments, latent fingerprint determiner 430 determines how the finger was removed from the contact surface of the fingerprint sensor during the finger lift action. For example, latent fingerprint determiner 430 can determine whether or not the finger was removed in a substantially vertical direction. It should be appreciated that if the finger is removed in a substantially vertical direction, rather than in a non-vertical direction, there is an increased likelihood that a latent fingerprint remains on the contact surface. Latent fingerprints are generally the results of oils, perspiration, or other fluids or residues being transferred from the finger to the contact surface, or present on the contact surface. If the finger is removed in a substantially vertical direction, the deposited fluids will generally conform to the pattern of the fingerprint. In contrast, if the finger is removed in a non-vertical direction, e.g., laterally, there is an increased likelihood that the deposited fluids will be smudged or smeared during the finger lift action, obscuring the deposits such that the deposits transferred to the surface do not resemble a fingerprint. Embodiments described herein may also perform scans in a similar manner to determine a condition of the contact surface.

In some embodiments, latent fingerprint determiner 430 determines how the finger was removed from the contact surface by receiving the series of fingerprint sensor images 415 captured at fingerprint image capture 410, and analyzing fingerprint sensor images 415. In one embodiment, during the analysis a position of the fingerprint with respect to the fingerprint sensor within the series of fingerprint sensor images 415 is determined. Based at least in part on the position of the fingerprint over the series of fingerprint sensor images 415, it is determined how the finger was lifted from the contact surface. For example, the center, or any other position, may be determined of the fingerprint, and the position of the center with respect to the image/sensor may be analyzed over time as the user remove the finger. In one embodiment, the analysis also includes determining a relative force applied by the finger on the fingerprint sensor over the series of fingerprint sensor images 415. Using the determined force the finger lift action can be analyzed.

If the fingerprint does not substantially move within the series of fingerprint sensor images 415, latent fingerprint determiner 430 determines that the finger was removed from the contact surface of the fingerprint sensor in a substantially vertical direction. Alternatively, if the fingerprint moves within the series of fingerprint sensor images 415, latent fingerprint determiner 430 determines that the finger was removed from the contact surface of the fingerprint sensor in a substantially non-vertical direction. In this manner, a determination is implicitly made as to whether a latent fingerprint remains on the contact surface by analyzing the finger lift action.

In some embodiments, the finger lift action is analyzed when the finger is lifted, and/or when the finger is put on the fingerprint sensor. When the finger is put on the fingerprint sensor, the finger contact is not instantaneous, and in the motion determination the position of the finger with respect to the sensor surface is determined. During the action of pressing the finger on the fingerprint sensor, a sequence (e.g., series) of fingerprint sensor images is acquired. By comparing these fingerprint sensor images, the motion of the finger with respect to the sensor surface can be determined. When the user just presses down and up in a pure vertical manner, there is no motion in the plane of the sensor surface, and there is only motion perpendicular to the sensor surface. This vertical motion has a higher likelihood of leaving latent fingerprints. In contrast, when the user removes the finger in a purely sideways wiping motion, the motion is only in the plane of the sensor surface. This action has a smudging action and has a very low likelihood or probability of leaving a latent fingerprint.

In some embodiments, a motion vector is determined when the user removes the finger, and this motion vector can be compared to a reference motion vector to determine the likelihood of leaving a latent fingerprint. For example, if the reference motion vector is perpendicular to the sensor surface, the likelihood of leaving a latent fingerprint is high when the motion vector is close to the reference vector. If the angle between the reference motion vector and the motion vector is close to 90 degrees, meaning the motion vector has a large component parallel to the surface, the likelihood of leaving a latent fingerprint is low. Thus, the motion analysis is used to determine the probability of a latent fingerprint. The motion of the user may be classified in types of motion, such as e.g., substantially vertical motion, or horizontal (e.g., non-vertical) motion (with respect to surface), and the classification may be used to determine the latent fingerprint (probability). If the device has a motion sensor, the motion of the device during the finger action may also be measure by the motion sensor, and this motion data may also be used in the analysis.

In some embodiments, latent fingerprint determiner 430 determines a probability of a latent fingerprint remaining on the contact surface of the fingerprint sensor subsequent the finger lift action. The probability is compared to a latent fingerprint threshold. Provided the probability satisfies the latent fingerprint threshold, it is determined that a latent fingerprint remains on a contact surface of the fingerprint sensor.

In other embodiments, determining whether a latent fingerprint remains on a contact surface of the fingerprint sensor subsequent the finger lift action includes performing a latent fingerprint capture operation subsequent removal of the finger from a contact surface of the fingerprint sensor. This can be performed by fingerprint image capture 410 after the finger has been removed from the fingerprint sensor. In the present embodiment, fingerprint image capture 410 operates to perform a fingerprint capture operation on the contact surface in the absence of a finger, sensing the latent fingerprint. The image generated from the fingerprint capture operation is analyzed, and it is determined whether a latent fingerprint remains on the contact surface. If the latent fingerprint capture operation detects a latent fingerprint, it is determined that a latent fingerprint remains on a contact surface of the fingerprint sensor. In one embodiment, prior to performing the latent fingerprint capture operation, it is confirmed that the finger is not in contact with the contact surface. In some embodiments, after the finger is removed, a latent fingerprint capture operation is immediately conducted to detect latent fingerprints. The latent fingerprint capture operation is used to measure any pattern in any type or sort of contamination that could capture a latent fingerprint. Because a latent fingerprint may be more difficult to detect than an actual fingerprint on a finger, the system may adapt the system parameters. For example, longer signal measurement or integrations and/or sensitivity changes may be performed before capturing the latent fingerprint.

The above mentioned embodiments may also be combined. For example, if it is determined based on the motion that there is a reasonable likelihood of a latent fingerprint, the system may try to measure the latent fingerprint. Any measured latent fingerprint may be analyzed to determine the likelihood of abuse. Typically, a threshold area of readable fingerprint is set, with small readable areas below the threshold being ignored. Quality of the fingerprint and resemblance to the fingerprint of the user may also be a factor. The system may compare the latent fingerprint to the stored fingerprint patterns of authorized user, to see if the latent fingerprint can be used to gain access to the system.

Latent fingerprint determiner 430 is configured to forward a determination that a latent fingerprint remains on the contact surface of the fingerprint sensor to instruction provider 440 in response to making such a determination. Instruction provider 440 is configured to provide instruction 445 on addressing the latent fingerprint. In some embodiments, instruction provider 440 is configured to provide instruction 445 to a user (e.g., visual and/or audible instruction) on addressing the latent fingerprint. In other instruction provider 440 is configured to provide instruction 445 to fingerprint sensing system (e.g., device 110) on automatically addressing the latent fingerprint.

In one embodiment, instruction provider 440 provides instruction 445 as a visual message displayed on a display device. For example, the message may be that there is a likelihood that a latent fingerprint has been left on the contact surface and/or include directions to place the finger on a contact surface of the fingerprint sensor and remove the finger in a non-vertical direction (e.g., to smear the latent fingerprint), to wipe the fingerprint with a cloth or tissue, or to operate a manual sweep to clear the latent fingerprint. In one embodiment, instruction provider 440 provides instruction 445 as an audible message presented using a speaker device. For example, the message may include directions to place the finger on a contact surface of the fingerprint sensor and remove the finger in a non-vertical direction (e.g., to smear the latent fingerprint), to wipe the fingerprint with a cloth or tissue, or to operate a manual sweep to clear the latent fingerprint. It should be appreciated that instruction provider 440 may provide both visual and audible messages.

It should be appreciated that instruction 445 can be a visual, textual, audible, or vibratory signal. If verification of addressing the latent fingerprint is detected (e.g., the finger contacted the fingerprint sensor and was removed in a non-vertical direction or a mechanical sweep was activated), the instruction 445 can be omitted, with a general message thanking the user being provided. The instruction 445 may comprise information about the probability of a latent fingerprint. The instruction 445 may also include an image of the detected latent fingerprint to show what was left behind. The instruction 445 may also comprise a message that no latent fingerprint was likely left behind. The instruction 445 may also indicate that certain actions may not be allowed or will not be performed until the patent fingerprint has been removed.

In some embodiments, fingerprint sensor image(s) 415 captured during the fingerprint image capture 410 is to perform fingerprint authentication 450. In some embodiments, during fingerprint authentication 450 it is determined whether addressing the latent fingerprint is performed (e.g., is action taken to clear the latent fingerprint from the contact surface). Responsive to determining that the addressing the latent fingerprint is performed, the fingerprint authentication 450 is completed. In one embodiment, instruction provider 440 is configured to instruct a user (e.g., visually and/or audibly) that completion of fingerprint authentication requires removal of the latent fingerprint. In one embodiment, the fingerprint sensor includes a mechanical sweep for removing the latent fingerprint. In one embodiment, responsive to activation of the mechanical sweep, it is determined that the latent fingerprint is removed.

It should be appreciated that in accordance with some embodiments, finger sensing system 400 executes fingerprint lift action detector 420, latent fingerprint determiner 430, and/or instruction provider 440 provided there is a likelihood of public access to the mobile electronic device. For example, where fingerprint sensing system is implemented within a mobile electronic device, the latent fingerprint related operations of fingerprint sensing system 400 may only be executed when it is determined that the mobile electronic device is in a public space. The mobile electronic device may include a position sensor (e.g., a GPS sensor), or may be registered to a location in other ways (e.g., via wireless connection access point). If the mobile electronic device is in a secure location (e.g., home, office, etc.), it may not be necessary to address latent fingerprints, so as to preserve processing power and battery power.

Figure 5:
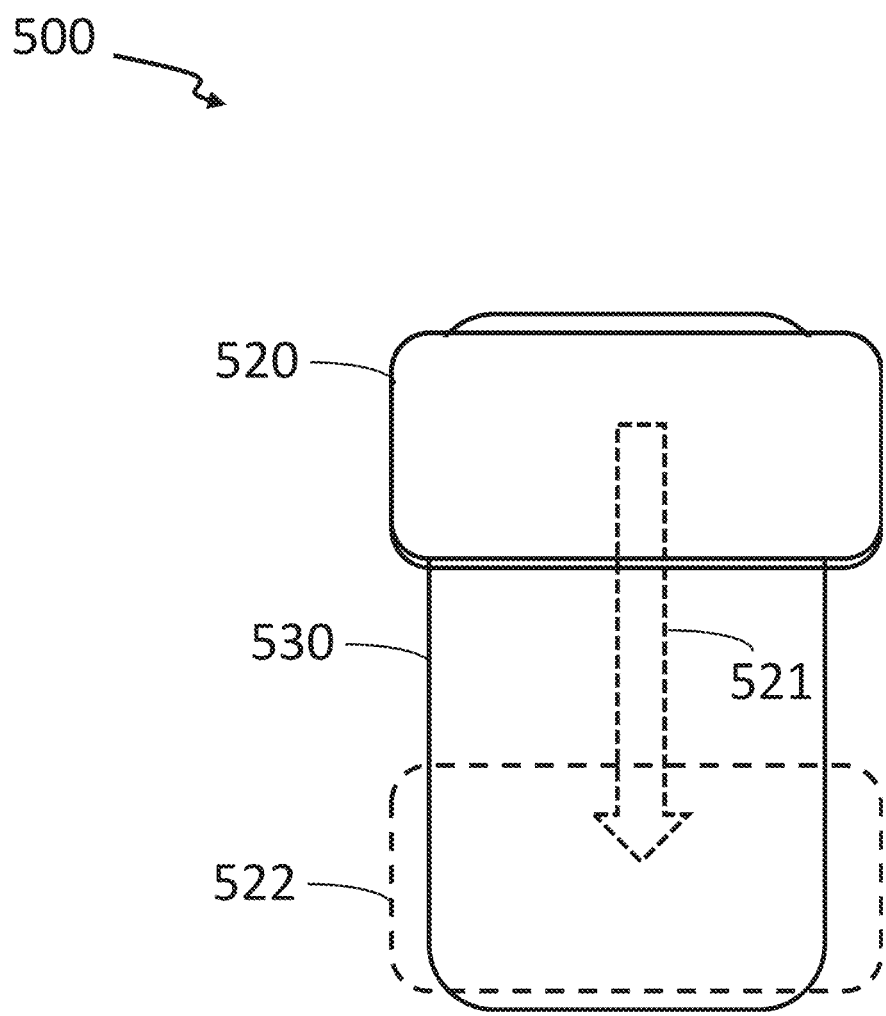
FIG. 5 illustrates a device including a mechanical sweep 500 for removing latent fingerprints from a contact surface of a fingerprint sensor, according to embodiments.

FIG. 5 illustrates a device including a mechanical sweep 500 for removing latent fingerprints from a contact surface of a fingerprint sensor, according to embodiments. As illustrated, mechanical sweep 500 includes a movable cover 520 and finger platen 530. A portion of the movable cover 520 facing the finger platen 530 can be provided with a resilient silicone wipe, soft microfiber covering, elastomeric ridge, or similar material suitable for wiping any latent fingerprints on the finger platen 530. In operation, the movable cover 520 can be moved in a direction noted by arrow 521 to a position 522, in the process wiping the latent prints from the finger platen 530. In some embodiments, this process can be automatic, or initiated in response to detected probability of presence of a latent fingerprint. In other embodiments, movable cover 520 is manually activated by a user. In some embodiments, the system can require that the movable cover 520 be swept across the finger platen 530 before system authorization or lock release is provided.

In other embodiments, the movable cover can be designed as a wiper sweep fixed at one point, a rotating element, or any other suitable mechanism for providing removal of latent prints. Various hydrophobic or low friction coatings can be applied to either the movable cover 520 or the finger platen 530 to improved latent print removal.

In some embodiments, cleaning solutions, thermal, or ultraviolet light treatments can be used alone or in combination with mechanical or vibratory mechanisms to remove the latent prints. In some embodiments, hydrophobic or low friction coatings can include polymeric coatings. In other embodiments, various non-polymeric material coatings (e.g. $TiO_2$ or other ceramics) or nanoscale patterning can be used to reduce oil retention on the finger platen 530.

Example Operations for Operating a Fingerprint Sensor and for Detecting and Addressing Latent Fingerprint on a Contact Surface of a Fingerprint Sensor FIGS. 6 through 10 illustrate flow diagrams of example methods for operating a fingerprint sensor to detect and address latent fingerprints on a contact surface of the fingerprint sensor, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

Figure 6:
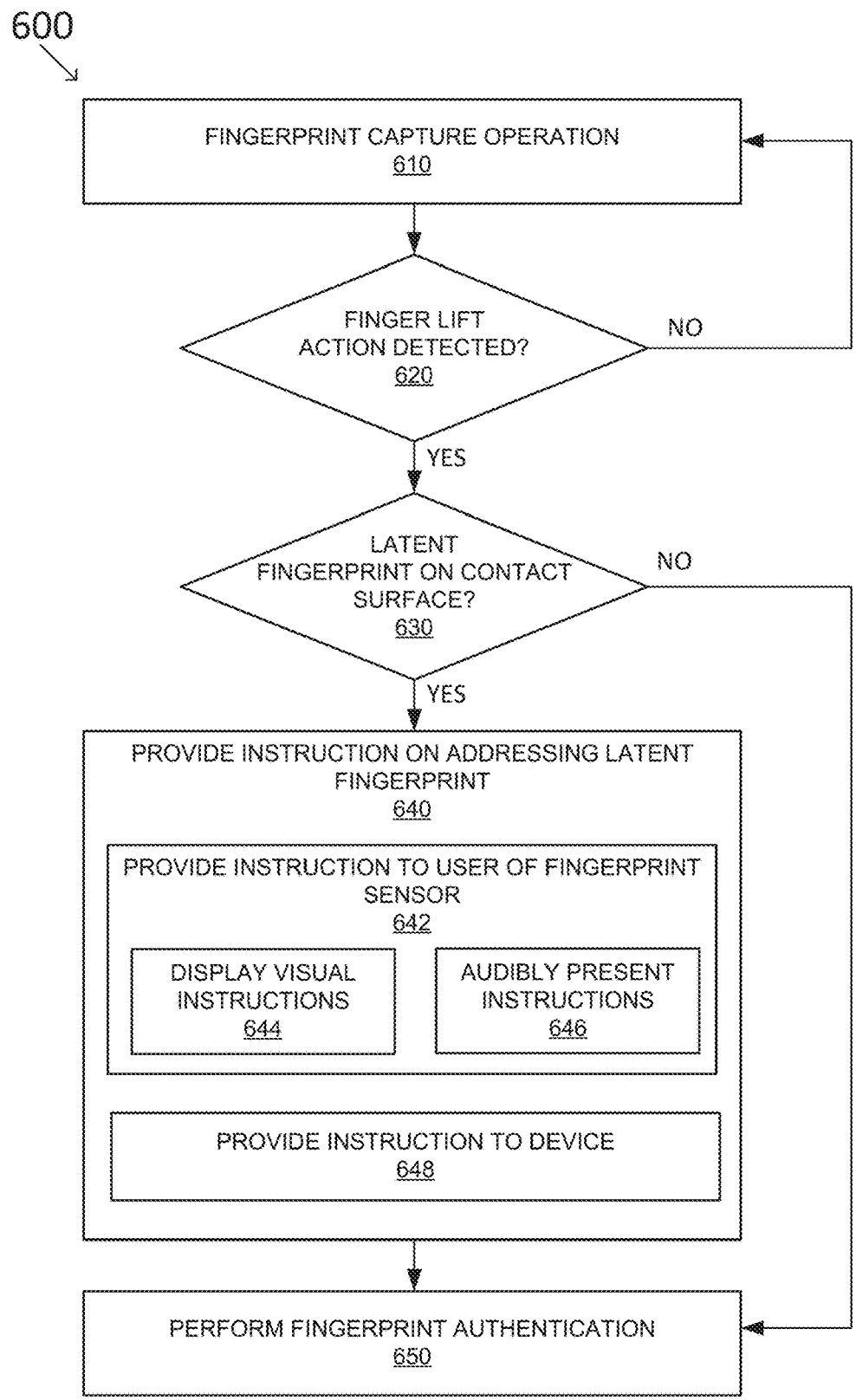
FIG. 6 illustrates a flow diagram of an example process for operating a fingerprint sensor to address a latent fingerprint on the contact surface of the fingerprint sensor, according to some embodiments.

With reference to FIG. 6, flow diagram 600 illustrates example process for operating a fingerprint sensor to address a latent fingerprint on the contact surface of the fingerprint sensor, according to some embodiments. At procedure 610 of flow diagram 600, a fingerprint capture operation is performed on a fingerprint of a finger contacting the fingerprint sensor. At procedure 620, it is determined whether a finger lift action is detected. If a finger lift action is not detected, flow diagram 600 continues with procedure 610. If a finger lift action is detected, as shown at procedure 630, it is determined whether a latent fingerprint remains on a contact surface of the fingerprint sensor subsequent the finger lift action. In some embodiments, procedure 630 is performed if there is a likelihood of public access to the mobile electronic device.

Figure 7:
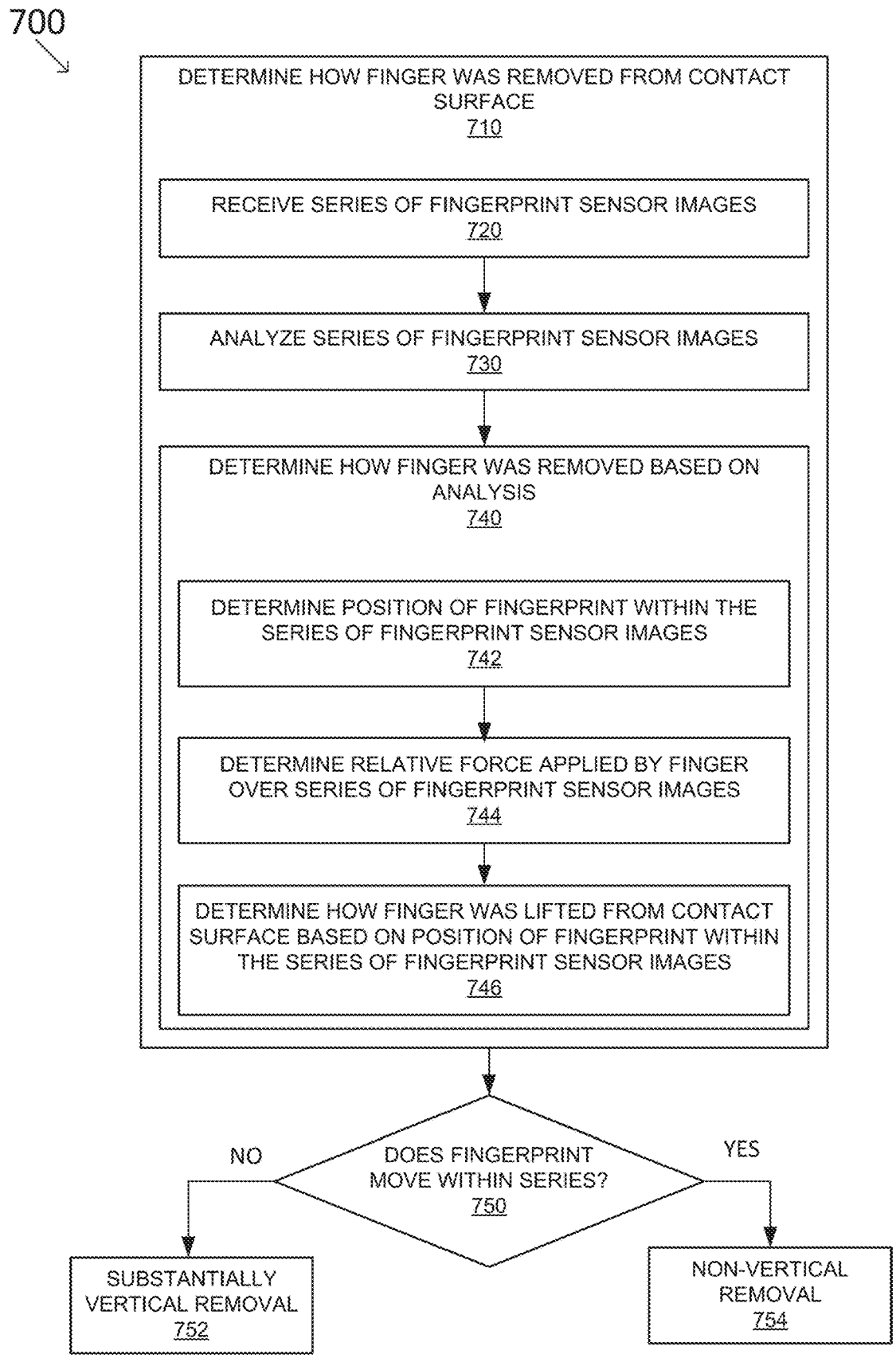
FIG. 7 illustrates a flow diagram of an example process for determining whether a latent fingerprint remains on a contact surface of the fingerprint sensor, according to some embodiments.

In one embodiment, procedure 630 is performed according to the procedures of flow diagram 700 of FIG. 7. With reference to FIG. 7, flow diagram 700 illustrates an example process for determining whether a latent fingerprint remains on a contact surface of the fingerprint sensor, according to some embodiments. At procedure 710, it is determined how the finger was removed from the contact surface of the fingerprint sensor during the finger lift action. In one embodiment, as shown at procedure 720, a series of fingerprint sensor images captured during the fingerprint capture operation is received. At procedure 730, the series of fingerprint sensor images are analyzed. At procedure 740, it is determined how the finger was removed from the contact surface of the fingerprint sensor during the finger lift action based at least in part on the analysis of procedure 730. In one embodiment, as shown at procedure 742, a position of the fingerprint with the series of fingerprint sensor images is determined. In one embodiment, as shown at procedure 744, a relative force applied by the finger over the series of fingerprint sensor images. It should be appreciated that procedure 744 is optional and flow diagram 700 may proceed to procedure 746 upon completion of procedure 742. At procedure 746, a determination of how the finger was lifted from the contact surface is made based at least in part on the position of the fingerprint over the series of fingerprint sensor images. In some embodiments, the relative force is also used to determine how the finger was lifted from the contact surface.

At procedure 750, it is determined whether the fingerprint moves position within the series of fingerprint sensor images. If the fingerprint does not substantially move within the series of fingerprint sensor images, as shown at procedure 752, it is determined that the finger was removed from the contact surface of the fingerprint sensor in a substantially vertical direction, and that a latent fingerprint remains on the contact surface of the fingerprint sensor. If the fingerprint does move within the series of fingerprint sensor images, as shown at procedure 754, it is determined that the finger was removed from the contact surface of the fingerprint sensor in a non-vertical direction, and that there is not a latent fingerprint on the contact surface of the fingerprint sensor.

Figure 8:
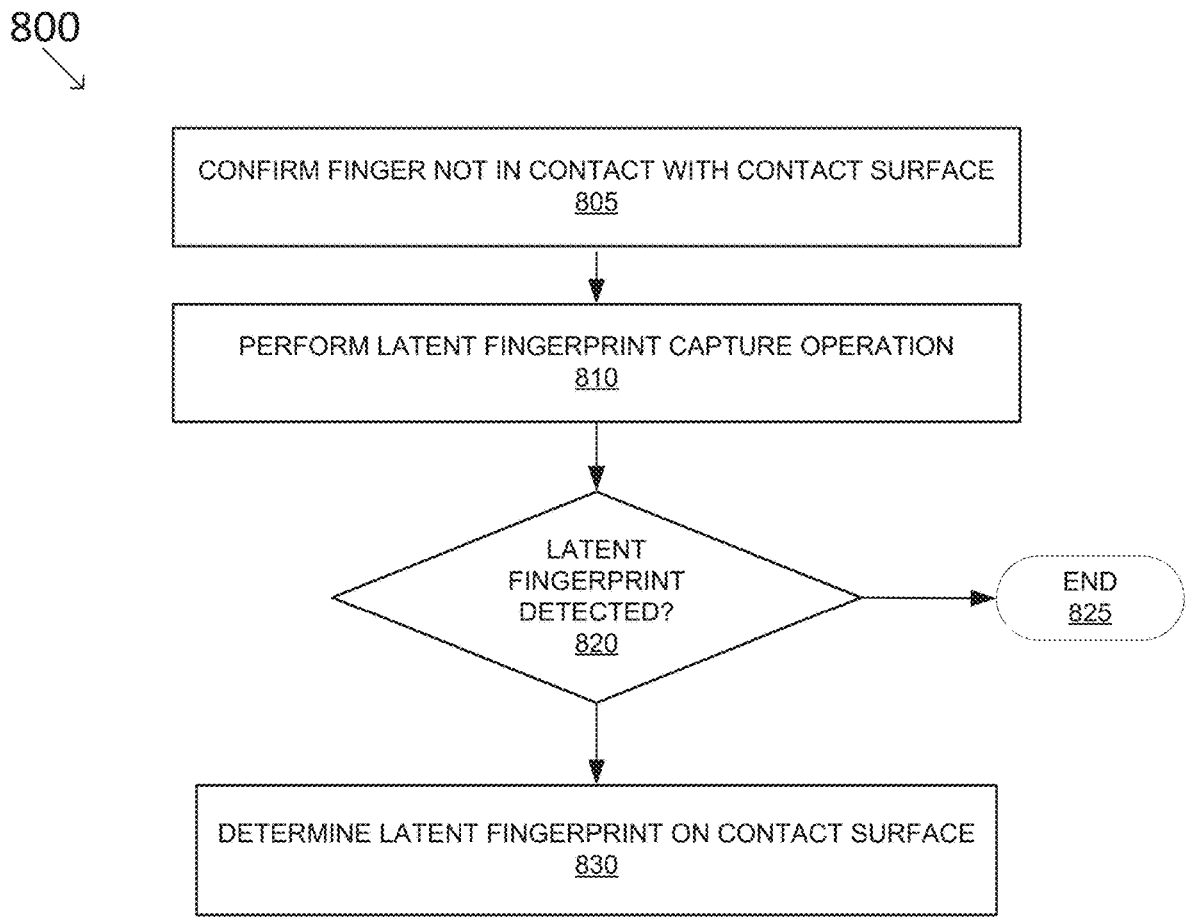
FIG. 8 illustrates a flow diagram of an example process for determining whether a latent fingerprint remains on a contact surface of the fingerprint sensor, according to other embodiments.

In another embodiment, procedure 630 is performed according to the procedures of flow diagram 800 of FIG. 8. With reference to FIG. 8, flow diagram 800 illustrates an example process for determining whether a latent fingerprint remains on a contact surface of the fingerprint sensor, according to other embodiments. In one embodiment, as shown at procedure 805, it is confirmed that a finger is not in contact with the contact surface. At procedure 810, a latent fingerprint capture operation is performed subsequent removal of the finger from a contact surface of the fingerprint sensor, where the latent fingerprint capture operation is performed by scanning the contact surface in the absence of a finger for residue forming a latent fingerprint. At procedure 820, it is determined whether a latent fingerprint is detected during the latent fingerprint capture operation. If a latent fingerprint is not detected, as shown at procedure 825, flow diagram 800 ends. If a latent fingerprint is detected, as shown at procedure 830, it is determined that a latent fingerprint remains on the contact surface.

Figure 9:
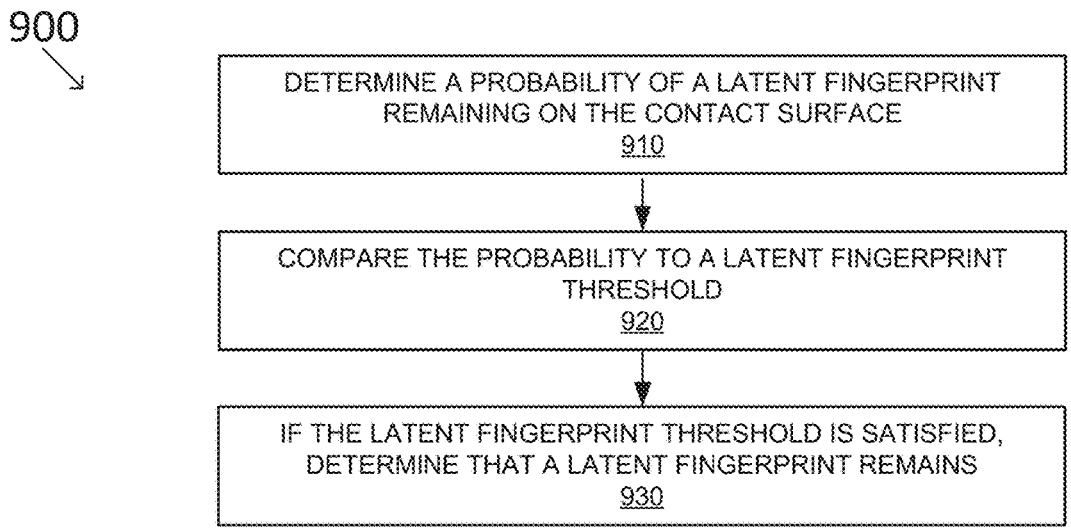
FIG. 9 illustrates a flow diagram of an example process for determining whether a latent fingerprint remains on a contact surface of the fingerprint sensor, according to another embodiment.

In some embodiments, procedure 630 is performed according to the procedures of flow diagram 900 of FIG. 9. With reference to FIG. 9, flow diagram 900 illustrates an example process for determining whether a latent fingerprint remains on a contact surface of the fingerprint sensor, according to another embodiment. In one embodiment, as shown at procedure 910, a probability of a latent fingerprint remaining on the contact surface of the fingerprint sensor subsequent the finger lift action is determined. It should be appreciated that the probability can be based on any number of factors, including and without limitation: how the finger was lifted from the contact surface, whether a latent fingerprint capture operation detected a latent fingerprint, environmental conditions, etc. At procedure 920, the probability is compared to a latent fingerprint threshold. At procedure 930, if the probability satisfies the latent fingerprint threshold, it is determined that a latent fingerprint remains on a contact surface of the fingerprint sensor.

Returning to FIG. 6, if procedure 630 does not detect a latent fingerprint on the contact surface, flow diagram 600 proceeds to procedure 650, where fingerprint authentication is performed. It should be appreciated that procedure 650 can also be performed concurrently with procedure 630, in some embodiments. If procedure 630 does detect a latent fingerprint on the contact surface, flow diagram 600 proceeds to procedure 640.

At procedure 640, instruction on addressing the latent fingerprint is provided. In some embodiments, as shown at procedure 642, instruction is provided to a user of the fingerprint sensor on how to address the latent fingerprint. In one embodiment, as shown at procedure 644, a message (e.g., visual instructions) is displayed on a display device (e.g., the same device including the fingerprint sensor or another device associated with the user). In another embodiment, as shown at procedure 646, a message (e.g., audible instructions) is audibly presented using a speaker device. It should be appreciated that procedures 644 and 646 may both be performed (e.g., visual and audible instruction is provided). For example, the message can include directions to wipe the contact surface with a cloth or tissue, directions on using a manual mechanical sweep, or directions to place the finger on the contact surface of the fingerprint sensor and remove the finger in a non-vertical direction to smudge or smear the latent fingerprint.

In other embodiments, as shown at procedure 648, instruction is provided to a device for automatic clearing of the latent fingerprint. For example, an automatic mechanical sweep may be activated in response to receiving the instruction.

Figure 10:
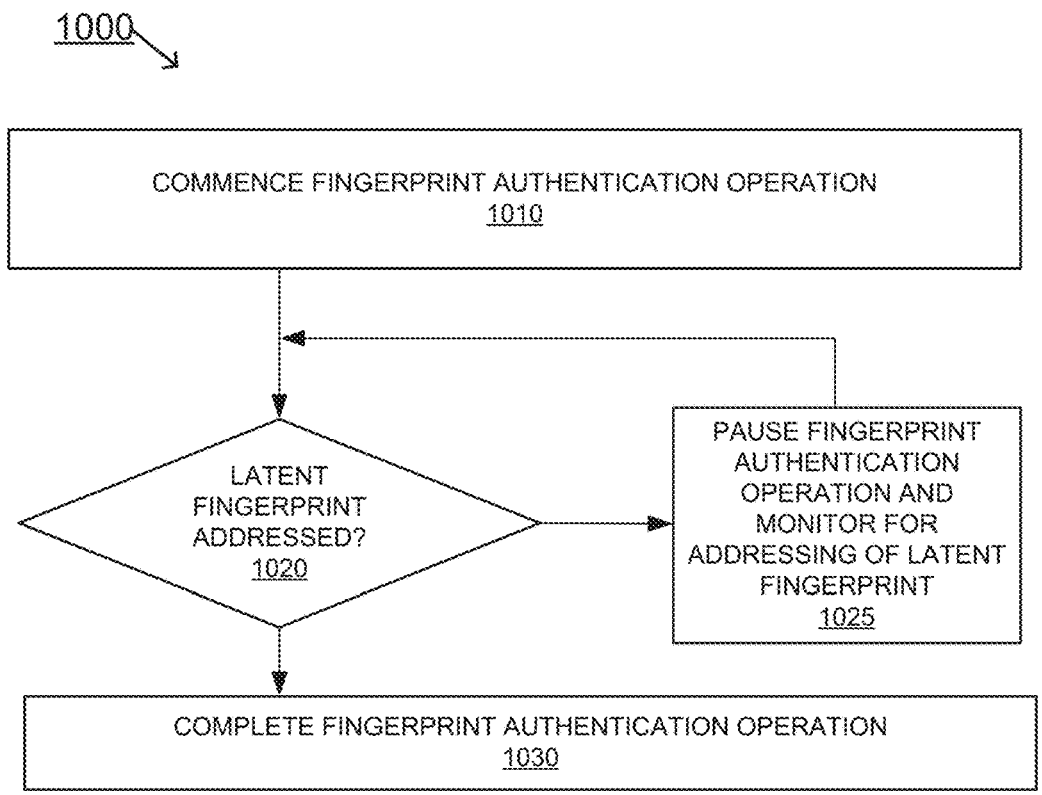
FIG. 10 illustrates a flow diagram of an example process for performing fingerprint authentication subsequent detection of a latent fingerprint, according to some embodiments.

In some embodiments, as shown at procedure 650, fingerprint authentication is performed. In some embodiments, procedure 650 is performed according to the procedures of flow diagram 1000 of FIG. 10. With reference to FIG. 10, flow diagram 1000 illustrates an example process for performing fingerprint authentication subsequent detection of a latent fingerprint, according to some embodiments. At procedure 1010, a fingerprint authentication operation is commenced. At procedure 1020, it is determined whether a detected latent fingerprint has been addressed. If it is determined that a detected latent fingerprint has not been addressed, as shown at procedure 1025, the fingerprint authentication operation is paused and addressing of the latent fingerprint is monitored. At procedure 1030, upon detecting that the latent fingerprint has been addressed, the fingerprint authentication operation is completed. In this manner, additional security precautions are provided by ensuring that a latent fingerprint is addressed (e.g., removed) prior to authentication a user. In other embodiments, the authentication operation is completed, but access to the system is only granted upon confirmation that the latent fingerprint has been addressed.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for operating a fingerprint sensor, the method comprising:
    performing a fingerprint capture operation on a fingerprint of a finger contacting the fingerprint sensor;
    detecting a finger lift action;
    determining whether a latent fingerprint remains on a contact surface of the fingerprint sensor subsequent the finger lift action, wherein the determining whether the latent fingerprint remains on the contact surface of the fingerprint sensor subsequent the finger lift action comprises:
        determining how the finger was removed from the contact surface of the fingerprint sensor during the finger lift action; and
        responsive to determining that the finger was removed from the contact surface of the fingerprint sensor in a substantially vertical direction, determining that the latent fingerprint remains on the contact surface of the fingerprint sensor; and
    responsive to determining that the latent fingerprint remains on the contact surface of the fingerprint sensor subsequent the finger lift action, providing instruction on clearing the latent fingerprint.

2. The method of claim 1, wherein the determining how the finger was removed from the contact surface of the fingerprint sensor during the finger lift action comprises:
    receiving a series of fingerprint sensor images captured during the fingerprint capture operation;
    analyzing the series of fingerprint sensor images;
    determining how the finger was removed from the contact surface of the fingerprint sensor during the finger lift action based at least in part on the analyzing the series of fingerprint sensor images;
    responsive to determining that the fingerprint does not substantially move within the series of fingerprint sensor images, determining that the finger was removed from the contact surface of the fingerprint sensor in a substantially vertical direction; and
    responsive to determining that the fingerprint moves within the series of fingerprint sensor images, determining that the finger was removed from the contact surface of the fingerprint sensor in a substantially non-vertical direction.

3. The method of claim 2, wherein the determining how the finger was removed from the contact surface of the fingerprint sensor during the finger lift action based at least in part on the analyzing the series of fingerprint sensor images comprises:
    determining a position of the fingerprint within the series of fingerprint sensor images; and
    determining how the finger was lifted from the contact surface based at least in part on the position of the fingerprint over the series of fingerprint sensor images.

4. The method of claim 3, wherein the determining how the finger was removed from the contact surface of the fingerprint sensor during the finger lift action further comprises:
    determining a relative force applied by the finger on the fingerprint sensor over the series of fingerprint sensor images.

5. The method of claim 1, wherein the determining whether the latent fingerprint remains on the contact surface of the fingerprint sensor subsequent the finger lift action comprises:
    performing a latent fingerprint capture operation subsequent removal of the finger from the contact surface of the fingerprint sensor; and
    responsive to determining that the latent fingerprint capture operation detects a latent fingerprint, determining that the latent fingerprint remains on the contact of the fingerprint sensor.

6. The method of claim 5, wherein the determining whether the latent fingerprint remains on the contact surface of the fingerprint sensor subsequent the finger lift action further comprises:
    confirming that the finger is not in contact with the contact surface.

7. The method of claim 1, wherein the providing instruction on addressing the latent fingerprint comprises:
    displaying, on a display device, a message comprising directions to place the finger on the contact surface of the fingerprint sensor and remove the finger in a non-vertical direction.

8. The method of claim 1, wherein the providing instruction on addressing the latent fingerprint comprises:
    audibly presenting, using a speaker device, a message comprising directions to place the finger on the contact surface of the fingerprint sensor and remove the finger in a non-vertical direction.

9. The method of claim 1, further comprising:
    using a fingerprint sensor image captured during the fingerprint capture operation to perform fingerprint authentication;

determining whether clearing the latent fingerprint is performed; and responsive to determining that the clearing the latent fingerprint is performed, completing the fingerprint authentication.

10. The method of claim 9, wherein the providing instruction on addressing the latent fingerprint comprises:

instructing a user that completion of fingerprint authentication requires removal of the latent fingerprint.

11. The method of claim 1, wherein the fingerprint sensor comprises a mechanical sweep for removing the latent fingerprint.

12. The method of claim 11, further comprising:

responsive to activation of the mechanical sweep, determining that the latent fingerprint is removed.

13. The method of claim 1, wherein the determining whether the latent fingerprint remains on the contact surface of the fingerprint sensor subsequent the finger lift action comprises:

determining a probability of the latent fingerprint remaining on the contact surface of the fingerprint sensor subsequent the finger lift action;

comparing the probability to a latent fingerprint threshold; and provided the probability satisfies the latent fingerprint threshold, determining that the latent fingerprint remains on the contact of the fingerprint sensor.

14. The method of claim 1, wherein the providing instruction on addressing the latent fingerprint comprises:

providing instructions to a user of the fingerprint sensor.

15. The method of claim 1, wherein the providing instruction on addressing the latent fingerprint comprises:

providing instructions to device for automatic clearing of the latent fingerprint.

16. The method of claim 1, further comprising:

determining a condition of a contact surface of the fingerprint sensor.

17. The method of claim 1, wherein the fingerprint sensor is disposed within a mobile electronic device, the method further comprising:

responsive to determining that there is a likelihood of public access to the mobile electronic device, executing the determining whether the latent fingerprint remains on the contact surface of the fingerprint sensor subsequent the finger lift action.

18. An electronic device comprising:

a fingerprint sensor;

a display device;

a memory; and a processor configured to:

perform a fingerprint capture operation on a fingerprint of a finger contacting the fingerprint sensor;

detect a finger lift action;

determine whether a latent fingerprint remains on a contact surface of the fingerprint sensor subsequent the finger lift action; and provide instruction on clearing the latent fingerprint responsive to determining that the latent fingerprint remains on the contact surface of the fingerprint sensor subsequent the finger lift action displaying, on the display device, a message comprising directions to place the finger on the contact surface of the fingerprint sensor and remove the finger in a non-vertical direction.

19. A non-transitory computer readable storage medium having computer readable program code stored thereon for causing a computer system to perform method for operating a fingerprint sensor, the method comprising:

performing a fingerprint capture operation on a fingerprint of a finger contacting the fingerprint sensor;

detecting a finger lift action;

determining whether a latent fingerprint remains on a contact surface of the fingerprint sensor subsequent the finger lift action;

responsive to determining that the latent fingerprint remains on the contact surface of the fingerprint sensor subsequent the finger lift action, providing instruction on clearing the latent fingerprint;

using a fingerprint sensor image captured during the fingerprint capture operation to perform fingerprint authentication;

determining whether clearing the latent fingerprint is performed; and responsive to determining that the clearing the latent fingerprint is performed, completing the fingerprint authentication.

20. A method for operating a fingerprint sensor, the method comprising:

performing a fingerprint capture operation on a fingerprint of a finger contacting the fingerprint sensor;

detecting a finger lift action;

determining whether a latent fingerprint remains on a contact surface of the fingerprint sensor subsequent the finger lift action, wherein the determining whether the latent fingerprint remains on the contact surface of the fingerprint sensor subsequent the finger lift action comprises:

determining a probability of the latent fingerprint remaining on the contact surface of the fingerprint sensor subsequent the finger lift action; comparing the probability to a latent fingerprint threshold; and provided the probability satisfies the latent fingerprint threshold, determining that the latent fingerprint remains on the contact surface of the fingerprint sensor; and responsive to determining that the latent fingerprint remains on the contact surface of the fingerprint sensor subsequent the finger lift action, providing instruction on clearing the latent fingerprint.

21. An electronic device comprising:

a fingerprint sensor;

a speaker device;

a memory; and a processor configured to:

perform a fingerprint capture operation on a fingerprint of a finger contacting the fingerprint sensor;

detect a finger lift action;

determine whether a latent fingerprint remains on a contact surface of the fingerprint sensor subsequent the finger lift action; and provide instruction on clearing the latent fingerprint responsive to determining that the latent fingerprint remains on the contact surface of the fingerprint sensor subsequent the finger lift action by audibly presenting, using the speaker device, a message comprising directions to place the finger on the contact surface of the fingerprint sensor and remove the finger in a non-vertical direction.

* * * * *